United States Patent
Manegold et al.

(10) Patent No.: US 6,671,646 B2
(45) Date of Patent: Dec. 30, 2003

(54) SYSTEM AND PROCESS TO ENSURE PERFORMANCE OF MANDATED SAFETY AND MAINTENANCE INSPECTIONS

(75) Inventors: Eric S. Manegold, Seattle, WA (US); Robie G. Russell, Seattle, WA (US); William Brinton, Jr., Des Moines, WA (US); Brett A. Brinton, Seattle, WA (US); Daniel R. Mayer, Issaquah, WA (US); Charles Michael McQuade, Issaquah, WA (US); Richard Lugash, San Mateo, CA (US)

(73) Assignee: Zonar Compliance Systems, LLC, Seattle, WA (US)

( * ) Notice: Subject to any disclaimer, the term of this patent is extended or adjusted under 35 U.S.C. 154(b) by 150 days.

(21) Appl. No.: 09/951,104

(22) Filed: Sep. 11, 2001

(65) Prior Publication Data

US 2003/0050764 A1 Mar. 13, 2003

(51) Int. Cl.[7] ............................................. G06M 11/04
(52) U.S. Cl. ..................................................... 702/127
(58) Field of Search .......................... 702/127; 701/33; 250/338; 703/1; 364/514, 330, 551; 340/933, 426, 52, 870; 235/380; 343/6; 73/116, 660

(56) References Cited

U.S. PATENT DOCUMENTS

| | | | |
|---|---|---|---|
| 4,025,791 A | 5/1977 | Lennington et al. | 250/341 |
| 4,258,421 A | 3/1981 | Juhasz et al. | 364/424 |
| 4,763,356 A | 8/1988 | Day, Jr. et al. | 379/368 |
| 4,804,937 A | 2/1989 | Barbiaux et al. | 340/52 F |
| 5,058,044 A | 10/1991 | Stewart et al. | 364/551.01 |
| 5,459,304 A | 10/1995 | Eisenmann | 235/380 |
| 5,557,254 A | 9/1996 | Johnson et al. | 340/426 |
| 5,557,268 A | 9/1996 | Hughes et al. | 340/933 |
| 5,585,552 A * | 12/1996 | Heuston et al. | 73/116 |
| 5,671,158 A * | 9/1997 | Fournier et al. | 345/8 |
| 5,680,328 A | 10/1997 | Skorupski et al. | 364/550 |
| 5,942,753 A * | 8/1999 | Dell | 250/338.1 |
| 6,128,959 A * | 10/2000 | McGovern et al. | 73/660 |
| 2001/0053983 A1 * | 12/2001 | Reichwein et al. | 705/1 |
| 2003/0033061 A1 * | 2/2003 | Chen et al. | 701/33 |

OTHER PUBLICATIONS

Tiscor: The Mobile Software Solutions Provider. *Inspection Manager: An Introduction*. nd. Slide presentation; 19pp. Available: www.Tiscor.com.

* cited by examiner

*Primary Examiner*—John Barlow
*Assistant Examiner*—Tung Lau
(74) *Attorney, Agent, or Firm*—Ronald M. Anderson (57) ABSTRACT

A handheld, portable device (20) is used to store data that indicates an operator was sufficiently close to each of a plurality of components during a safety inspection to actually inspect the components. The portable device includes a sensor (46) that detects tokens (12, 16, 24), such as radio frequency identification tags, which are affixed adjacent to the components. Messages (58) appearing on a display (40) of the portable device prompt the operator to proceed to each checkpoint, determine a state of the component disposed there, and if the component is not operating properly, indicate a plurality of predefined conditions from which the operator can choose to identify the observed condition of the component. The state and condition of each component entered during the safety inspection are stored as data that are subsequently transferred to a remote data storage site over a wire or wireless link.

32 Claims, 4 Drawing Sheets

DRIVER'S VEHICLE INSPECTION REPORT
AS REQUIRED BY THE D.O.T. FEDERAL MOTOR CARRIER SAFETY REGULATIONS

CARRIER: _______________________________________________

ADDRESS: _______________________________________________

DATE: _______________ TIME: ____________ A.M. _________ P.M.

CHECK ANY DEFECTIVE ITEM AND GIVE DETAILS UNDER "REMARKS"

TRACTOR/
TRUCK NO. _______________ ODOMETER READING _______________

- ☐ AIR COMPRESSOR
- ☐ AIR LINES
- ☐ BATTERY
- ☐ BODY
- ☐ BRAKE ACCESSORIES
- ☐ BRAKES, PARKING
- ☐ BRAKES, SERVICE
- ☐ CLUTCH
- ☐ COUPLING DEVICE
- ☐ DEFROSTER/HEATER
- ☐ DRIVE LINE
- ☐ ENGINE
- ☐ EXHAUST
- ☐ FIFTH WHEEL
- ☐ FRAME AND ASSEMBLY
- ☐ FRONT AXLE
- ☐ FUEL TANKS
- ☐ GENERATOR

- ☐ HORN
- ☐ LIGHTS
  - HEAD - STOP
  - TAIL - DASH
  - TURN INDICATORS
- ☐ MIRRORS
- ☐ MUFFLER
- ☐ OIL PRESSURE
- ☐ RADIATOR
- ☐ REAR END
- ☐ REFLECTORS
- ☐ SAFETY EQUIPMENT
  - FIRE EXTINGUISHER
  - REFLECTIVE TRIANGLES
  - FLAGS - FLARES - FUSEES
  - SPARE BULBS & FUSES
  - SPARE SEAL BEAM

- ☐ SUSPENSION SYSTEM
- ☐ STARTER
- ☐ STEERING
- ☐ TACHOGRAPH
- ☐ TIRES
- ☐ TIRE CHAINS
- ☐ TRANSMISSION
- ☐ WHEELS AND RIMS
- ☐ WINDOWS
- ☐ WINDSHIELD WIPERS
- ☐ OTHER

TRAILER(S) NO.(S) _______________

- ☐ BRAKE CONNECTIONS
- ☐ BRAKES
- ☐ COUPLING DEVICES
- ☐ COUPLING (KING) PIN
- ☐ DOORS

- ☐ HITCH
- ☐ LANDING GEAR
- ☐ LIGHTS - ALL
- ☐ ROOF
- ☐ SUSPENSION SYSTEM

- ☐ TARPAULIN
- ☐ TIRES
- ☐ WHEELS AND RIMS
- ☐ OTHER

REMARKS: _______________________________________________
_______________________________________________________
_______________________________________________________
_______________________________________________________
_______________________________________________________
_______________________________________________________
_______________________________________________________

☐ CONDITION OF THE ABOVE VEHICLE IS SATISFACTORY

DRIVER'S SIGNATURE: _______________________________________

☐ ABOVE DEFECTS CORRECTED
☐ ABOVE DEFECTS NEED NOT BE CORRECTED FOR SAFE OPERATION OF VEHICLE

MECHANIC'S SIGNATURE: _______________________ DATE: _______

DRIVER'S SIGNATURE: _________________________ DATE: _______

*FIG. 7 (PRIOR ART)*

SYSTEM AND PROCESS TO ENSURE PERFORMANCE OF MANDATED SAFETY AND MAINTENANCE INSPECTIONS

FIELD OF THE INVENTION

The present invention generally provides evidence that a person was physically at a designated position adjacent to a component of a machine or apparatus, and more specifically, provides an electronic record indicating when the person was physically disposed to carryout a safety inspection and to indicate a safety related operating condition of the component.

BACKGROUND OF THE INVENTION

A recent network television news program reported that nearly 40 percent of big rig tractor-trailers were so dangerous that they would be ordered off the road if inspected. While not all accidents involving commercial trucks and trailers are the result of defective equipment that could be identified in a safety inspection, a significant reduction in accidents is likely to be achieved by taking steps to ensure that key components of such equipment are inspected.

In response to the public's concern for the increase in large vehicle traffic on our nation's highways and the increased frequency of reported accidents involving commercial vehicles, Congress adopted the Motor Carrier Safety Improvement Act of 1999 (PL 106–159). Pursuant to this Act, the Federal Motor Carrier Safety Administration (FMCSA) was created within the U.S. Department of Transportation (DoT). Part of the mission of this new agency is to develop a long-term strategy to "improve commercial motor vehicle, operator, and carrier safety." It is expected that by successfully addressing these issues, the incidence of accidents by commercial carriers will be reduced.

In furtherance of its mission, the FMCSA convened a series of meetings and planning sessions with representatives from other federal agencies, the states, and the transportation industry. Through that process, FMCSA developed a policy entitled: "2010 Strategy—Saving Lives Through Safety, Innovation, and Performance." The primary goal of this policy is to improve transportation safety through the implementation of 31 strategic initiatives, which run the gamut from improved highway construction to better screening of drivers and equipment to detect potential equipment safety problems before they result in accidents.

The FMCSA's intention is to enhance motor carrier safety management practices through improved vehicle inspection, repair, and maintenance procedures. As acknowledged in the 2010 Strategy, "[I] f these functions are not conducted properly, driver and vehicle deficiencies can increase the potential for a crash." Among the nine separate strategies contemplated by FMCSA to achieve this important objective is "the introduction of new technology to improve safety performance." In stating its highest priorities, the 2010 Strategy further distills its 31 initiatives down to 13 "highest priority" strategies. Significantly, four of these highest priority strategies can be directly promoted with appropriate technology that will provide an electronic record of vehicle safety inspections and will tend to encourage such inspections. Specifically, it will be important to promote and encourage: (a) vehicle inspections with a focus on technology improvements; (b) improved safety management practices; (c) greater emphasis on technology transfer and deployment to achieve safe operating equipment; and (d) improved safety data collection and analysis.

Figure 7:
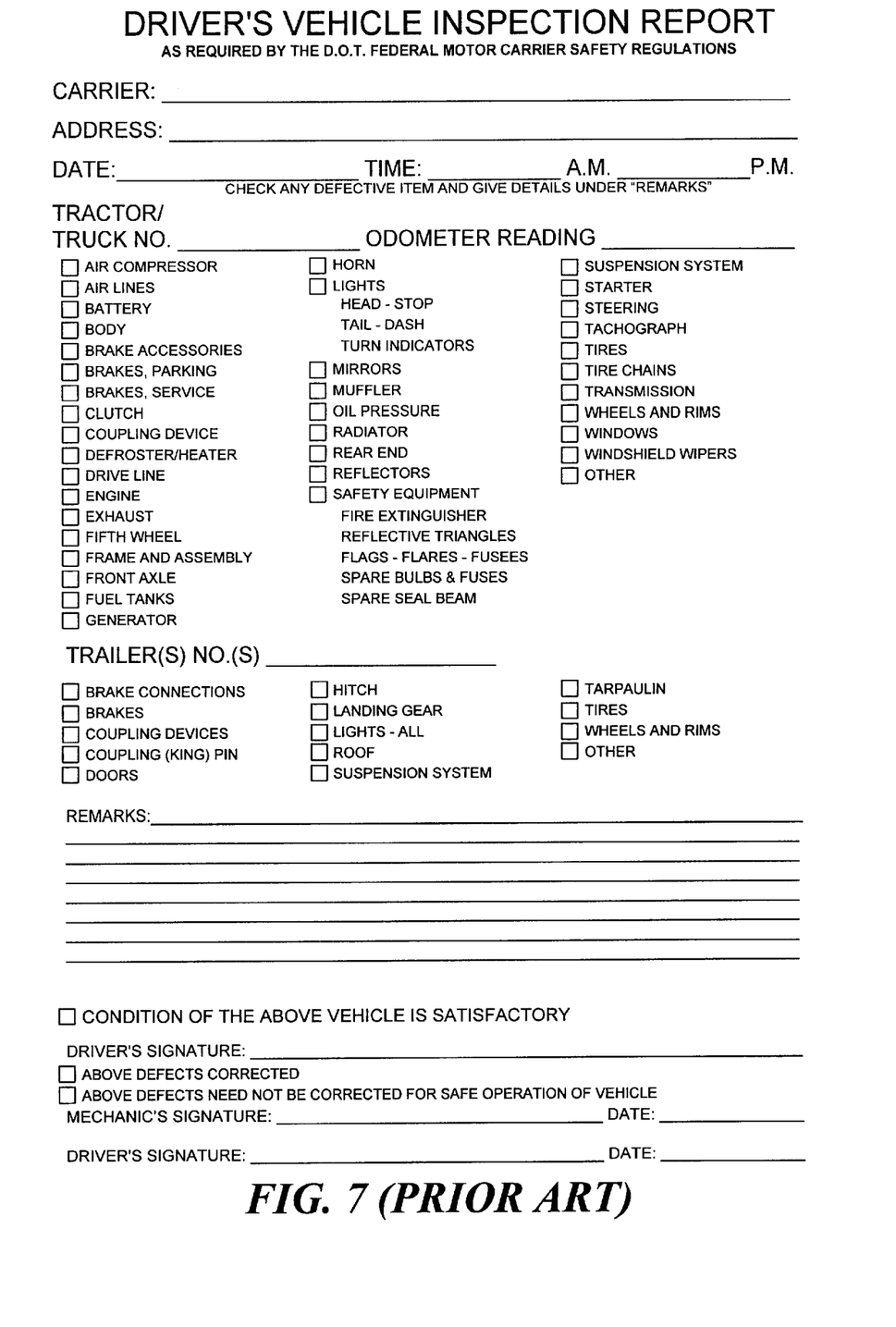
FIG. 7 (Prior Art) is an exemplary manually-completed inspection record used for safety inspections of tractors and trailers, illustrating the specific components and systems that are required to be inspected.

To avoid accidents caused by defective equipment, Federal law presently requires that commercial drivers make a visual inspection of specific components on a truck (i.e., tractor and trailer), such as the brake system, fuel system, warning lights, tires, etc., performing pre- and post-trip inspections of these basic, but critical components. An exemplary vehicle inspection report listing the components and systems that must be inspected by a driver to satisfy the DoT regulations is illustrated in FIG. 7. However, under the current system, a driver is only required to fill out a paper log and keep it on file for 90 days. Many experts report that less than half of the drivers ever perform the check; instead, many drivers simply fill out the report while seated in the cab of the truck or in a coffee shop. The report is meaningless unless the listed components and systems have actually been inspected. For example, a driver who fails to actually inspect components on his vehicle will not notice that brake fluid is leaking from a hydraulic master brake cylinder. As a result, the brakes on the driver's truck may fail, potentially causing a serious accident.

A signed inspection report does not provide any assurance that a driver actually inspected the components included on the report. However, technology might provide a way to at least ensure that a driver (or other person doing a safety inspection) was physically present in the vicinity of each component requiring inspection, even if the driver is not compelled to affirmatively inspect all of the components. Most people, if required to actually walk to a component such as a tire of a truck, will then be more willing to at least look at the condition of the component, particularly if the task of indicating the condition of the component if there is a problem, is made relatively simple and efficient.

An analogous approach is employed to ensure that a night watchman visits different locations in a building. To provide evidence that he has made his rounds, the night watchman must use a key contained in a lock box at each different location to activate a handheld timekeeping device, making a record of the time that the location was visited. The night watchman thus provides proof of having visited each location for purposes of performing a security check at specified times. However, a night watchman cannot record a security violation with the handheld device, and a security check by a night watchman does not relate to making a safety inspection of a component at a specific location on a truck. Also, requiring that a key be stored in a lock box on a truck or other system that is being inspected is not practical, and it is not efficient to require a driver or other person doing a safety inspection to manually use a key or other physical object to provide proof that the person physically visited the location during the safety inspection tour.

It would be desirable for a person making a safety inspection to carry a handheld device that automatically detects when the person is in the proximity of a component included on an inspection list and enters a record of the results of the inspection in a non-volatile memory. A sensor in the handheld device should respond to a tag or transponder associated with a component being inspected when the sensor is within a predetermined distance from the tag, by recording the event and displaying a menu that prompts the operator to enter data related to a safety condition of the component. For example, once the operator is within a range appropriate to permit inspection of the tires on a truck, the handheld device should enable the person inspecting the tires to indicate: (a) that the tires appear safe; (b) that the tires need servicing but are still usable; or, (c) that the tires are too unsafe to be driven. If the component needs servicing or is unsafe to use, the operator should be able to record a reason for that determination. Since proof that an inspection was made prior to driving a vehicle and the conditions of the components that were inspected may have an important bearing on any insurance claims and/or liability in the event of an accident with the vehicle, it would also be desirable to enable the data from the handheld device to be uploaded to a geographically separate central data storage facility after the inspection is completed.

Encouraging safety inspections of other types of equipment by creating a record providing evidence that a person doing the inspection actually visited each component that must be inspected has utility in many other applications other than the transportation industry. The concept is also useful in confirming the safe operating condition of machinery and components in other systems in which accidents related to equipment malfunction and failure must be avoided. For example, such a need exists in high-risk chemical and petrochemical operations, where periodic inspections of valves, pressure vessels, gauges, and other components must be carried out to avoid potentially disastrous and costly accidents in which significant loss of life and property might occur.

There does not appear to be any prior art mechanical or electronic device designed to verify that a person was in a specific location for purposes of carrying out a safety inspection at that location. U.S. Pat. No. 5,680,328 discloses the use of electronic data entry equipment that simply takes the place of handwritten forms or checklists for recording data, but is unable to provide evidence that a person actually visited a component that was reportedly inspected. Other prior art references teach the transmission of data from a portable device to a central repository, by both wire and wireless network connections. The prior art also discloses that data from inspections can be used for generating safety or maintenance reports. However, the prior art does not disclose means to verify that a safety check was actually performed, or even that a person physically was in a position to carry out a safety inspection.

SUMMARY OF THE INVENTION

In accord with the present invention, a method is defined for providing a record indicating that a component of a vehicle or other type of apparatus or system was visited during a safety inspection. In this method, a portable device is provided for use in recording data related to the safety inspection. The portable device includes a sensor that produces a signal indicative that an operator has positioned the portable device proximate a component. A record of the signal produced by the sensor is made and is stored within the portable device, providing evidence that the operator was sufficiently close to the component to make a safety inspection of the component.

The method further includes the step of enabling the operator to store an indication of a condition of the component in the portable device. Preferably, the portable device provides a prompt that indicates the component the operator is to inspect. After the operator has inspected the component, a plurality of different states of the component are displayed to the operator, enabling the operator to select the state observed during the inspection. If the component needs servicing or is unusable, the operator can select one of a plurality of different possible conditions to indicate an observed condition of the component. A record of the condition selected by the operator is then stored in the portable device. The record of the signal, the state, and any condition selected by the operator are transferred from the portable device to a more permanent storage at a remote site that is separate from the portable device, either immediately after the inspection or at a later time. Preferably, each record is transmitted to the remote site using a data signal conveyed over a wire network and/or a wireless network.

The method further includes the step of affixing a token adjacent to the component. The sensor responds to the token to detect when the portable device is proximate the component. The token causes the signal produced by the sensor to identify the component, e.g., a specific tire on a vehicle or a specific system component of a system or other apparatus. In most applications, a plurality of tokens are provided, each token being associated with and affixed adjacent to a different one of the plurality of components. The token then causes the signal produced by the sensor to identify the component when the portable device is proximate the component associated with the token. Also, different predetermined ranges can be specified for the plurality of components, so that an appropriate predetermined range can be specified for each component.

Another aspect of the present invention is directed to a system for providing evidence that a plurality of components were visited during a safety inspection. The system includes a plurality of tokens, each of which is associated with a different component that is to be checked during the safety inspection and affixed adjacent to the component Also included in the system is the portable device, which is adapted to be transported to each component to be inspected during the safety inspection. The portable device includes a housing, a display, an operator interface, and a memory in which machine instructions and data are stored. A sensor included with the portable device detects when the portable device is proximate each of the plurality of tokens, and thus, within a predetermined maximum distance from each of the components with which the plurality of tokens are separately associated. The sensor then produces a signal indicative that the portable device is within the predetermined maximum distance from the component. A controller is coupled to the display, the memory, the operator interface, and the sensor and executes the machine instructions causing the memory to store data indicative of each component visited during the safety inspection in response to the signal produced by the sensor. Other functions implemented by the system are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Utility of the Present Invention

The present invention is applicable in recording data resulting from a safety inspection of almost any type of equipment, apparatus, or system and is applicable to other types of inspections in which it is desirable to maintain a data record as evidence that the person making the inspection was actually physically present at a checkpoint or component requiring inspection. While the data accumulated with the present invention is not conclusively presumptive evidence that each component of a system was indeed carefully inspected, in most cases, if a person is required to visit a checkpoint or component, it is very likely that the person will actually inspect the component. By encouraging a person making an inspection to be physically close enough to a component to carry out an inspection, and by providing evidence of that fact in the data recorded, there is at least a justifiable presumption that the person actually did the inspection.

Figure 1:
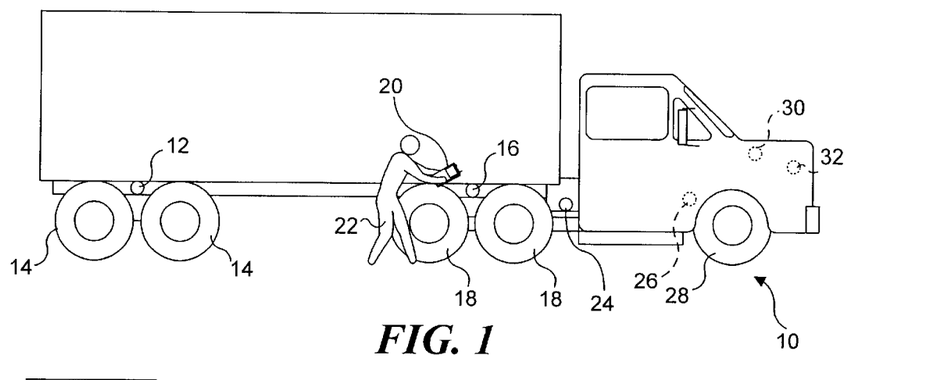
FIG. 1 is a schematic diagram of a tractor and trailer equipped with tokens at each component to be inspected, illustrating a person using a portable device in accord with the present invention.

FIG. 1 illustrates a tractor-trailer 10 with which an embodiment of the present invention is usable to carry out a safety inspection. Tractor-trailer 10 is provided with a plurality of tokens affixed adjacent to each checkpoint or component that is to be inspected. While only a few of the tokens are illustrated in FIG. 1, FIG. 7 lists all of the components or systems that should be inspected if a driver is to be in compliance with the DoT regulations regarding pre- and post-inspections of such vehicles. A token will be affixed adjacent to the components and systems listed in FIG. 7, although several components might be associated with the same token. For example, in the engine compartment, one token might be used for both the radiator and the belts. As a driver moves about the tractor and trailer, evidence that the driver or the person doing the inspection moved sufficiently close to the components being inspected so that the inspection could actually take place is recorded in a portable device 20. Further details of portable device 20 are described below.

For the few tokens illustrated in FIG. 1, the relevance of the disposition of the token adjacent to a corresponding component of the tractor-trailer 10 should be evident. For example, token 12 is disposed adjacent to tandem dual rear tires 14 on the trailer. Since all the tires of the tandem dual rear wheels on the left rear of the trailer are readily visible from a position adjacent to token 12, a single token is sufficient to determine that the driver was sufficiently close so that all four tires at the left rear of the trailer could be readily inspected. Similarly, tandem dual wheels 18 on the left rear of the tractor are readily inspected when an observer 22 is positioned as shown in FIG. 1. In this position, the observer moves portable device 20 within a maximum predefined range of token 16, which is exposed above tandem dual wheels 18. Portable device 20, detects and responds to token 16, recording data indicating that the driver was in a position to inspect tandem dual rear wheels 18 on the tractor. It is contemplated that the operator may initiate the recognition of a token by activating a switch, or the portable device can instead simply respond when a token is sufficiently close to the portable device.

Other tokens 24, 26, 30, and 32 are illustrated adjacent other components of the tractor that are part of the safety inspection. For example, token 26 is affixed adjacent a tire 28 on the right front of the tractor, while tokens 30 and 32 are accessible if the front hood of the tractor is opened and are disposed adjacent the hydraulic brake master cylinder and the engine belts/radiator, respectively (not shown separately).

For each token there is a predetermined maximum distance that portable device 20 can be held from the token that will enable the portable device to detect the token, and thus the component that is associated with it in order to produce a record as evidence that the person holding the portable device was in a position to inspect the component. Depending upon the component to be inspected and the type of token, different predetermined maximum distances may be assigned to the various components. The different predetermined maximum distances might be implemented by partially shielding a token to vary the distance at which the portable device can detect the token.

Figures 2, 3:
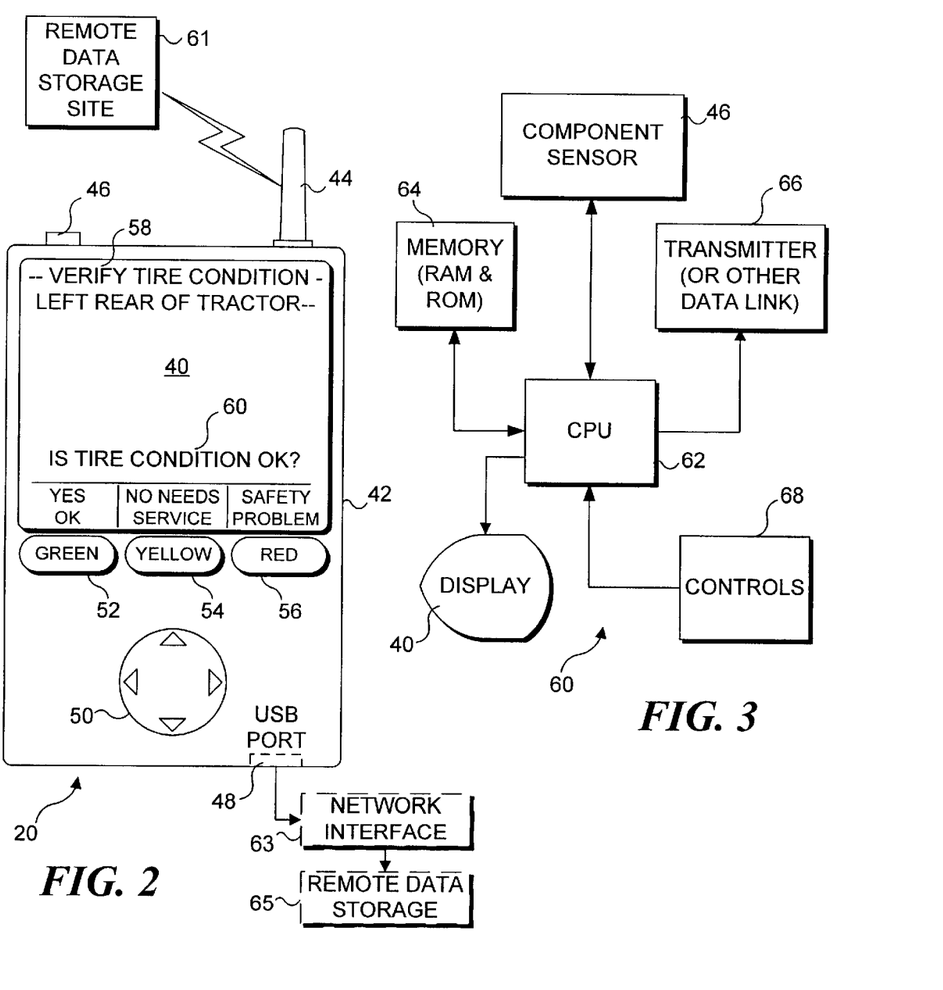
FIG. 2 is a top plan view of a portable device for use in making a safety inspection of a tractor and trailer, showing a message that prompts the operator to inspect the left rear tires of the tractor.
FIG. 3 is a schematic block diagram of the functional components included in the portable device of FIG. 2.

Operator 20 is prompted to approach the next component in a series of components that must be checked during the safety inspection by a message 58 appearing on a display 40 of portable device 20, as shown in FIG. 2. For example, if operator 22 has just completed the inspection of tandem dual tires 14 on the left rear of the truck, display 40 provides a prompt 58 indicating that the operator should "verify tire condition—left rear of tractor." A sensor 46 on portable device 20 responds to token 16 when the portable device is held less than the predetermined maximum distance from token 16 by producing a signal indicating that the portable device was within the required range of tandem dual tires 18 to enable the operator to inspect the tires. Display 40 also provides a prompt 60 to operator 22 requesting that the operator indicate whether the tire condition is okay. If so, the operator presses a green control button 52 corresponding to the message "YES, OK." However, if during the visual inspection of the tires the operator determines that they require servicing, the operator is prompted to depress a yellow control button 54 on the portable device. Certain conditions such as a tread separation or a nail or other sharp object lodged in the tire would likely lead the person doing the inspection to depress a red control button 56, indicating a safety problem that requires the operator to refer to a supervisor who will likely elect to delay the trip until the tire is repaired and/or replaced or take other appropriate action depending upon the nature of the component and the type of problem that makes the component unsafe to use. Portable device 20 also includes a cursor control 50, which is a four-position switch that enables a cursor (not shown in this figure) to be moved up or down, and left or right. Cursor control 50, green, yellow, and red control buttons 52, 54, and 56 and display 40 are all disposed on a front surface of a housing 42 of portable device 20. Sensor 46 is disposed on the top edge of housing 42, while an optional universal serial bus (USB) port 48 is disposed on the edge of housing 42, opposite from sensor 46.

An antenna 44 is also disposed on the top edge of the housing for transmitting radio frequency (RF) transmissions to a remote data storage site 61 that is used for long-term storage of data resulting from safety inspections. The data produced by a safety inspection indicates each of the components of the vehicle (or other system or apparatus being inspected) that were visited by the operator, so that the portable device was positioned within the predetermined maximum distance from the token associated with the component, and also indicates the status of the component. In the event that the component appears to need service or represents a safety problem (as would be evident if the operator depressed yellow control button 54 or red control button 56, respectively), the operator is prompted to select one of a plurality of predefined conditions that justify the state of the component determined by the operator and best represent its observed condition.

If the state of the component is okay so that green control button 52 is depressed, i.e., if the component does not require any service and is usable or otherwise within its nominal operating parameters, there is no need to provide an indication of the condition of the component. The condition need only be recorded as part of the data stored in the portable device if either yellow control button 54 or red control button 56 is depressed by the operator to indicate the state of the component being other than "OK."

Figures 4, 5:
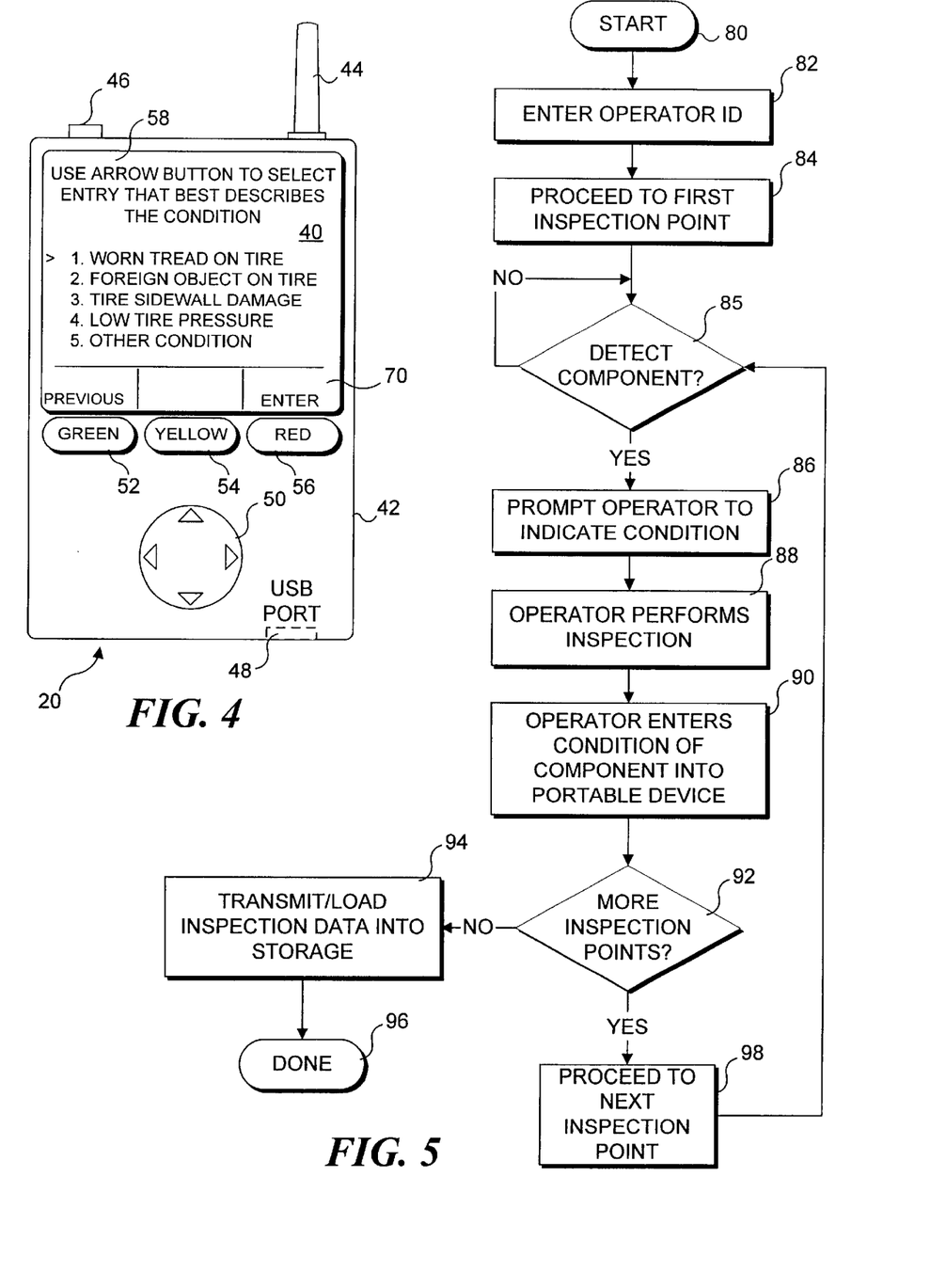
FIG. 4 is a top plan view of the portable device of FIG. 2, illustrating a menu that indicates possible conditions of tires in need of service.
FIG. 5 is a flow chart showing the steps followed in carrying out a safety inspection in accord with the present invention.

A further example illustrating the selection of a condition relating to the example shown in FIG. 2 is included in FIG. 4. As shown in FIG. 4, if the operator has indicated that the state of the tires is such that they need service by pressing yellow control button 54, portable device 20 automatically displays several possible conditions that would have led an operator to indicate that state. In the example shown, message 58 prompts the operator to use the arrow button (i.e., cursor control 50) to select a possible condition from among the listed options that best describes the observed condition of the tires. Display 40 includes five possible conditions, the last of which covers any condition that might not be included among the first four that are listed. Using cursor control 50, the operator can move the cursor to the displayed statement that best describes the observed condition of the tire and then can depress red control 56, which corresponds to an "Enter" menu option 70 on display 40 for this screen. Green control 52 can be depressed to select a "Previous" display, if the operator elects to reconsider the state of the component that was previously selected.

FIG. 3 illustrates functional components 60 that are included in portable device 20, either on or inside housing 42. A central processing unit (CPU) 62 comprises the controller for portable device 20 and is coupled bi-directionally to a memory 64 that includes both random access memory (RAM) and read only memory (ROM). Memory 64 is used for storing data in RAM and machine instructions in ROM that control the functionality of CPU 62 when executed by it. CPU 62 is also coupled to receive operator input from controls 68. Collectively, controls 68 include green control button 52, yellow control button 54, red control button 56, and cursor control 50. In addition, CPU 62 provides text and graphics to display 40 for the prompts and other messages, and menu items and options from which the operator can select using cursor control 50.

After operator 22 has visited each of the checkpoints required for the safety inspection, the operator can optionally transmit the data that has been collected during the inspection to remote data storage site 61 through a RF transmission via antenna 44. The data provide evidence that the operator has visited the components and indicate the state and condition of the components that were visited and inspected. Alternatively, optional USB port 48 on portable device 20 can be coupled to a network interface 63 on an external cradle (not shown), which is in communication with remote data storage 65, as shown in FIG. 2. In FIG. 3, CPU 62 is shown communicating data to transmitter 66 (or through another data link) using a wire and/or wireless data communication link. The data collected and stored in memory 64 of portable device 20 during the safety inspection can thus be safely transferred to the remote data storage site and retained for as long as the data might be needed.

In some cases, it may be preferable to transmit the data to the remote site immediately after making a safety inspection to ensure that the data retained in memory 64 are not lost should an accident occur that destroys portable device 20. An accident destroying the evidence that the safety inspection was implemented could have an adverse effect during any litigation related to the accident. However, since the risk of such an accident is relatively remote, it is contemplated that an operator may collect the data from a number of safety inspections in memory 64 and then subsequently upload the data to remote data storage 65 by coupling the data to a cradle (not shown) that includes a USB port terminal and network interface. The cradle might be maintained by a carrier at a freight terminal.

Alternatively, the cradle might be disposed at a different site and/or connect to the remote data storage site through other types of communication links. One example of such a communication system is the OMNITRACS™ satellite mobile communication system sold by Qualcomm Corporation that enables drivers on the road and carriers to remain in communication with each other and enables the carrier to monitor the location of a tractor-trailer during a trip. By linking portable device 20 through USB port 48 to such a data communication system, the data stored within memory 64 can readily be transmitted to a remote site maintained by the carrier for long-term storage, even while a trip is in progress.

The tokens that are affixed at various points on the tractor-trailer (or adjacent components of other types of systems or apparatus unrelated to a vehicle) can be of several different types, depending upon the type of sensor 46 that is included on portable device 20. In a preferred embodiment, the token that is preferably employed is a radio frequency identification (RFID) tag that is attached with a fastener or an adhesive to a point on a frame or other support (not shown) adjacent to the component associated with the token. One type of RFID tag that is suitable for this purpose is the WORLDTAG™ token that is sold by Sokymat Corporation. This tag is excited by an RF transmission from portable device 20 via antenna 44. In response to the excitation energy received, the RFID tag modifies the RF energy that is received from antenna 44 in a manner that specifically identifies the component associated with the RFID tag, and the modified signal is detected by sensor 46.

An alternative type of token that can also be used in this invention is an IBUTTON™ computer chip, which is armored in a stainless steel housing and is readily affixed to a frame or other portion of the vehicle (or other type of apparatus or system), adjacent to the component associated with the IBUTTON chip. The IBUTTON chip is programmed with JAVA™ to provide a recognition signal when interrogated by a signal received from a nearby transmitter, such as from antenna 44 on portable device 20. The signal produced by the BUTTON chip is received by sensor 46, which determines the type of component associated with a token. This type of token is less desirable since it is more expensive, although the program instructions that it executes can provide greater functionality.

Yet another type of token that might be used is an optical bar code in which a sequence of lines of varying width encode light reflected from the bar code tag. The encoded reflected light is received by sensor 46, which is then read by an optical detector. Bar code technology is well understood in the art and readily adapted for identifying a particular type of component and location of the component on a vehicle or other system or apparatus. One drawback to the use of a bar code tag as a token is that the bar code can be covered with dirt or grime that must be cleaned before the sequence of bar code lines can be properly read. If the bar code is applied to a plasticized adhesive strip, it can readily be mounted to any surface and then easily cleaned with a rag or other appropriate material.

Yet another type of token usable in the present invention is a magnetic strip in which a varying magnetic flux encodes data identifying the particular component associated with the token. Such magnetic strips are often used in access cards that are read by readers mounted adjacent to doors or in an elevator that provides access to a building. However, in the present invention, the magnetic flux reader comprises sensor 46 on portable device 20. The data encoded on such a token is readily read as the portable device is brought into proximity of the varying magnetic flux encoded strip comprising such a token.

As yet another alternative, an active token can be employed that conforms to the BLUETOOTH™ specification for short distance data transfer between computing devices. However, it is likely that the range of the signal transmitted by the token would need to be modified so that it is substantially less than that normally provided by a device conforming to the BLUETOOTH specification. It is important that the portable device be able to detect that it is proximate to the component only within a predetermined maximum range selected to ensure that the operator is positioned to actually carry out an inspection of the component.

Logical Steps Implemented in the Present Invention

FIG. 5 illustrates the logical steps implemented in connection with the present invention to carry out a safety inspection of a vehicle or other apparatus or system. From a start block 80, a step 82 provides for manual entry of an operator identification (ID) into a data record, or the operator ID can already be stored in memory of the portable device, or can be automatically entered in response to a special operator ID tag disposed on the vehicle. Cursor control 50 is employed to sequentially select digits from a displayed list, to input the operator ID for the individual making the safety inspection. The operator ID might be a four (or more) digit number or alphanumeric code. Alternatively, a plurality of possible operator IDs might be displayed as a list on portable device 20, enabling the operator to select his/her operator ID from the list using cursor control 50 and one of the three control buttons.

Once the operator ID is entered, portable device 20 prompts the operator to proceed to a first inspection point. For example, as indicated in FIG. 2, message 58 prompts the operator to verify the tire condition on the left rear of the tractor. A decision step 85 determines if the portable device has detected the token associated with the component that is next to be inspected. If not, the logic loops until the component is detected. Once sensor 46 on portable device 20 has detected the token associated with the current component to be inspected, the logic then advances to a step 86 in which the operator is prompted to indicate a state of the component (and possibly, its condition). In a step 88, the operator performs the inspection, which may involve visually observing the state and condition of the component, or carrying out other steps that might be required to confirm the state and condition of the component. It is contemplated that in some types of inspections, a series of steps might be required to test the component to determine if it is operating properly, needs maintenance or repair, or is unusable. Again, portable device 20 can be programmed to provide appropriate prompts to direct the operator through a series of steps required to carry out the inspection of such a component. Accordingly, in a step 90 the operator selectively enters the condition of the component into portable device 20 using the control buttons and cursor control 50.

A decision step 92 determines if there are further inspection points in the safety inspection being carried out. If not, a step 94 provides for transmitting or loading the inspection data into storage at a remote site; this step can be done immediately after the inspection is completed, or at some later time, perhaps after additional safety inspections have been completed. Once the data are transmitted to the remote site for long-term storage, the process is completed in a step 96.

Assuming that further inspection points remain in the safety inspection at decision step 92, a step 98 provides for the operator to proceed to the next inspection point, which will again be determined by a prompt displayed to the operator on display 40 of portable device 20. The logic then loops back to decision step 85, which determines if the sensor on the portable device has detected the component, indicating that the portable device is within the predefined maximum range of the token, thus ensuring that the operator is sufficiently close to the component to inspect it.

Figure 6:
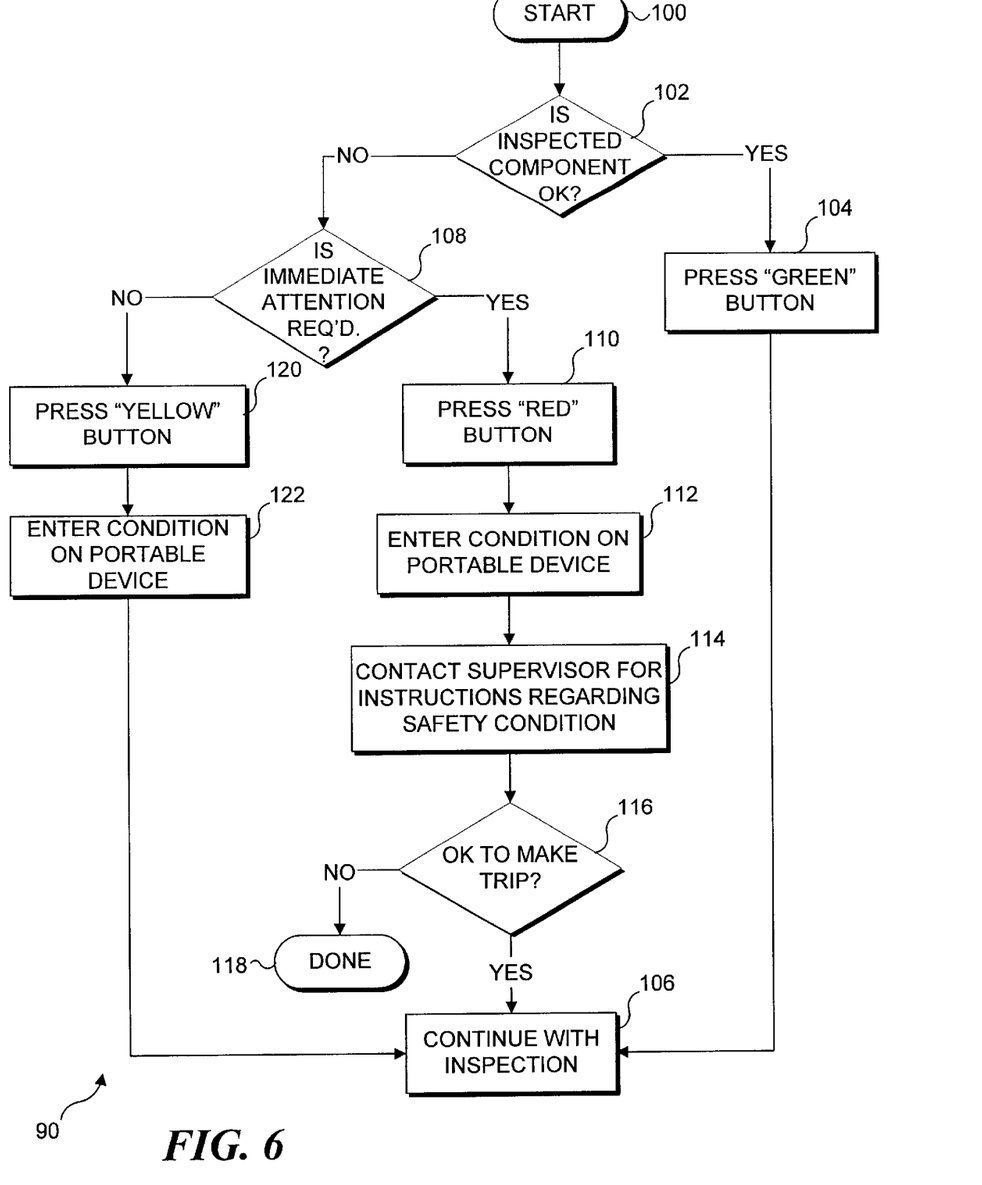
FIG. 6 is a flow chart illustrating the steps employed in recording a condition of a component that is being inspected using the portable device of FIGS. 2 and 4.

Further details of step 90 are illustrated in FIG. 6. From a start block 100, a decision step 102 determines if the inspected component is okay. If so, the operator presses green control button 52 in a step 104. Since the component is okay, nothing further is required for that component, and the logic then proceeds to a step 106, which provides that the operator can continue with the inspection, i.e., proceed with decision step 92 in FIG. 5.

However, if the determination in decision step 102 indicates that the inspected component is not okay, a decision step 108 enables the operator to determine if immediate attention is required. If so, the operator presses red control button 56 at a step 110 and enters the condition of the component on the handheld unit. For example, if the operator is inspecting a tire and determines that the tread of the tire is separating, the tire should not be used, but should instead be replaced, the operator would use the cursor control on the portable device to select an option for the condition "tread separating from tire" at a step 112. In most inspections, the operator would be required to contact a supervisor for instructions regarding the safety condition at a step 114. In the example just noted, the supervisor would likely arrange for the tire to be replaced by maintenance or repair personnel.

In some cases, a supervisor might override the operator's determination of the state of the component based upon the reported condition. Therefore, a decision step 116 determines if the supervisor has given authorization to the operator to make the trip, scheduling a later repair of the component. If so, the logic proceeds to step 106, in which the operator continues with the inspection as described above. If not, there is no further need to inspect the remainder of the vehicle at that point, since the complete inspection will need to be carried out again after the unsafe condition has been corrected, e.g., by replacing the defective tire. The logic is then done, as indicated in step 118.

In the event that the operator determines that immediate attention is not required at decision step 108, at a step 120, the operator presses yellow control button 54 on portable device 20. The operator then selects and enters the condition noted on the portable device, as indicated in a step 122. In the example shown in FIG. 4, six possible conditions are indicated by statements on display screen 40 for a tire that is still usable but needs service. In this case, the operator employs cursor control 50 to move the cursor to a selected statement that thus describes the observed condition of the component and then depresses red control button 56 to enter the condition, creating a record of the state and condition of the component currently being inspected that is retained within the memory of the portable device. Thereafter, the logic proceeds to step 106, in which the operator continues with the inspection.

Alternative to Portable Device

While it is likely that an initial preferred embodiment will employ portable device 20, it is also contemplated that an accessory might be provided for a personal digital assistant (PDA), such as the PALM™ PDA, that would enable the PDA to be used for the same functions as portable device 20. The accessory to the PDA will include a sensor to detect when the PDA is within the predetermined maximum range from the token associated with the component currently being inspected. The conventional controls on the PDA can be used to make and enter a selection. Furthermore, instead of using a cursor control, it is also contemplated that a touch screen display might instead be used for making selections of menu items and other options presented to the operator. In addition, the PDA would need to be programmed to carry out the functions implemented by portable device 20, as described above.

Other Applications of the Present Invention

Although the present invention will initially be used in connection with safety inspections of tractors and trailers in the commercial trucking industry, there are many other types of safety inspections unrelated to vehicles in which it is equally applicable. For example, in a chemical processing plant or a petroleum refinery it is common for technicians to make periodic safety inspections of valves, gauges, reactors, pressure vessels, and other types of processing equipment and system components to ensure that they are operating properly and within nominal or acceptable limits. During an inspection, a technician may note that a valve is leaking slightly, and schedule it for repair or replacement at a later date. Clearly, if the leak is of a non-hazardous substance and is insignificant in volume, there might well be no reason to shut down the process line in which the valve is installed simply because of the leaking valve. However, if the valve is used in controlling an extremely hazardous or toxic substance, even a small leak may be unacceptable. In this case, the technician should immediately report the condition to a supervisor who would then likely shut down the process or divert the flow of hazardous substance to a different process line to enable the condition to be corrected by immediate replacement or repair of the valve. Based upon the preceding discussion that discloses how a first preferred embodiment of the present invention is used in recording data related to safety inspections of a vehicle, it should be evident that portable device 20 is also readily adapted to recording data from other inspections. In the example just noted, a technician would be prompted to inspect the valve, and once the portable unit was within a predetermined distance of the valve, would be prompted to indicate a state of the valve. If the technician depressed either yellow control button 54 or red control button 56, the display would provide a menu of possible conditions from which the technician could select, using cursor control 50 and red control button 56 to indicate the observed condition of the valve.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for providing a record that a component was visited during a safety inspection, comprising the steps of:
   (a) affixing a token adjacent to the component;
   (b) providing a portable device for use in recording data related to the safety inspection, said portable device including a sensor that responds to the token to detect when the portable device is disposed proximate the component, producing a signal indicative thereof;
   (c) enabling an operator to move the portable device proximate the component; and
   (d) automatically producing a record of the signal produced by the sensor that is stored within the portable device, said record providing evidence that the operator was sufficiently close to the component to make a safety inspection of the component.

2. The method of claim 1, further comprising the step of enabling the operator to store an indication of a condition of the component determined by inspecting the component, said indication being stored in the portable device.

3. The method of claim 1, further comprising the step of providing an indication to the operator of the component that the operator is to inspect.

4. The method of claim 1, further comprising the steps of:
   (a) displaying to the operator a plurality of different possible conditions of the component;
   (b) enabling the operator to select one of the plurality of different possible conditions, to indicate a condition of the component determined by the operator; and
   (c) storing in the portable device a record of said one of the plurality of different possible conditions selected by the operator.

5. The method of claim 4, further comprising the step of transferring the record of the signal and the record of said one of the plurality of different possible conditions from the portable device to a storage that is separate from the portable device.

6. The method of claim 5, wherein the step of transferring comprises the step of transmitting each record using data signal, over at least one of a wire network and a wireless network.

7. The method of claim 1, wherein the token causes the signal produced by the sensor to identify the component.

8. The method of claim 1, further comprising the step of affixing a plurality of tokens adjacent to a corresponding plurality of other components that are to be visited during the safety inspection, each of the plurality of tokens being associated with and affixed adjacent to a different one of the plurality of other components and causing the signal produced by the sensor when the portable device is proximate the other component associated with the token to identify said other component.

9. The method of claim 8, further comprising the step of recording the signal produced by the sensor in response to the plurality of tokens associated with the plurality of other components as the portable device is brought within a predetermined range for each of the plurality of other components.

10. The method of claim 8, further comprising the step of specifying a predetermined range for each of the plurality of other components, thus enabling different predetermined ranges to be specified for each of the plurality of other components.

11. The method of claim 1, further comprising the step of enabling the operator to select one of a plurality of different states of the component that is being inspected.

12. The method of claim 11, wherein the plurality of states include:
 (a) a first state in which the component is safe to operate;
 (b) a second state in which the component requires servicing, but is still usable; and
 (c) a third state in which the component is not safe to use.

13. The method of claim 12, wherein if either the second or third states are identified by the operator making the safety inspection, further comprising the step of displaying a plurality of possible conditions of the component to enable the operator to select one of the conditions to indicate why the operator selected either the second state or the third state.

14. The method of claim 13, further comprising the steps of automatically storing the state and of the condition selected by the operator within the portable device.

15. A system for providing evidence that a plurality of components were visited during a safety inspection, comprising:
 (a) a plurality of tokens, each token being associated with a different component that is to be visited during the safety inspection and affixed adjacent to said component; and
 (b) a portable device adapted to be transported to each component to be visited and inspected during the safety inspection, said portable device including:
  (i) a housing;
  (ii) a display;
  (iii) an operator interface;
  (iv) a memory in which machine instructions and data are stored;
  (v) a sensor for detecting when the portable device is proximate each of the plurality of tokens, and thus within a predetermined maximum distance from each of the components with which said plurality of tokens are separately associated, said sensor producing a signal indicative that the portable device is within the predetermined maximum distance from the components; and
  (vi) a controller coupled to the display, the memory, the operator interface, and the sensor, said controller executing the machine instructions and causing the memory to store data indicative of each component visited during the safety inspection, in response to the signal produced by the sensor.

16. The system of claim 15, wherein the machine instructions executed by the controller cause the controller to respond to the signal from the sensor by displaying a prompt on the display that requests entry of a state of a component that is currently proximate to the portable device, said state indicating whether the component is okay, or requires service, or is unusable.

17. The system of claim 16, wherein if the component requires service or is unusable, the machine instructions executed by the controller further cause the controller to display a plurality of possible conditions of the component and to enable at least one of the conditions to be selected, said memory retaining data corresponding to the state and the condition selected.

18. The system of claim 17, wherein the portable device further comprises a transmitter that is used to transmit the data to a remote site for storage.

19. The system of claim 17, further comprising network interface that couples the portable device to at least one of a wire and wireless network, to convey the data to a remote site for storage.

20. The system of claim 15, further comprising a radio frequency transmitter disposed in the portable device, wherein the plurality of tokens each comprises a radio frequency transponder that is excited by radio frequency energy emitted by the radio frequency transmitter, producing an altered radio frequency signal that is detected by the sensor.

21. The system of claim 15, wherein the plurality of tokens each produce a pattern of magnetic flux, and wherein the sensor detects the pattern of magnetic flux from a token to produce a signal indicative of a specific type of component associated with the token.

22. The system of claim 15, wherein the plurality of tokens each correspond to an optical pattern, and wherein said sensor detects to optical pattern of a token to produce a signal indicative of a specific type of component associated with the token.

23. The system of claim 15, wherein each of the plurality of tokens has a selected predetermined range at which the sensor detects the token, so that different predetermined ranges can be provided for different tokens in the plurality of tokens, providing a desired predetermined range for each different type of component with which a token is used.

24. A portable data recorder for recording data during a safety inspection, said data at least indicating whether a checkpoint was visited during the safety inspection by an operator carrying the portable data recorder, comprising:
 (a) a housing;
 (b) a display mounted on the housing;
 (c) an operator interface mounted on the housing to enable input and selection of options provided on the display;
 (d) a memory in which machine instructions and data are stored;
 (e) a sensor for detecting when the portable device is proximate each of a plurality of checkpoints during the safety inspection, wherein once said sensor is within a predefined range from each checkpoint, the sensor detects one of a magnetic field, an electrical field, an optical pattern, and a radio frequency signal that is associated with the checkpoint, producing a signal indicating that the housing is proximate the checkpoint; and
 (f) a controller coupled to the display, the memory, the operator interface, and the sensor, said controller executing the machine instructions and causing the memory to store data indicative of each checkpoint visited during the safety inspection, in response to the signal produced by the sensor.

25. The portable data recorder of claim 24, wherein each of the checkpoints corresponds to a specific portion of apparatus that is being inspected during the safety inspection, said data indicating the specific portion of the apparatus.

26. The portable data recorder of claim 25, wherein the controller prompts for input of a state of the specific portion of the apparatus currently being inspected, the state that is input with the operator interface being included in the data stored within the memory.

27. The portable data recorder of claim 26, wherein the operator interface is adapted to input one of a plurality of different states, including a state in which one of the following is indicated:

(a) the specific portion of the apparatus is operating within acceptable limits and is usable;

(b) the specific portion of the apparatus is in need of servicing; and (c) the specific portion of the apparatus is unusable because of a safety concern.

28. The portable data recorder of claim 27, wherein, if the specific portion of the apparatus is not operating within acceptable limits and is not usable, the controller is programmed to prompt for input of a current condition of the specific portion of the apparatus.

29. The portable data recorder of claim 27, wherein the operator interface includes at least one control for indicating the state of the specific portion of the apparatus currently being inspected.

30. The portable data recorder of claim 24, further comprising a radio frequency transmitter that is used to transfer the data to a remote storage.

31. A portable data recorder for recording data during a safety inspection, said data at least indicating whether a checkpoint was visited during the safety inspection by an operator carrying the portable data recorder, comprising:

(a) a housing;

(b) a display;

(c) an operator interface to enable input and selection of options provided on the display;

(d) a memory in which machine instructions and data are stored;

(e) a sensor for detecting when the portable device is proximate each of a plurality of checkpoints during the safety inspection, said sensor producing a signal indicating that the portable device is proximate the checkpoint;

(f) a controller coupled to the display, the memory, the operator interface, and the sensor, said controller executing the machine instructions and causing the memory to at least temporarily store data indicative of each checkpoint visited during the safety inspection, in response to the signal produced by the sensor; and (g) a radio frequency transmitter that is selectively used to transfer the data stored in the memory to a remote storage.

32. A portable data recorder for recording data during a safety inspection, said data at least indicating whether a checkpoint was visited during the safety inspection by an operator carrying the portable data recorder, comprising:

(a) a housing;

(b) a display;

(c) an operator interface that enables input and selection of options provided on the display;

(d) a memory in which machine instructions and data are stored;

(e) a sensor for detecting when the portable device is proximate one of a plurality of tokens, each token being disposed adjacent to one of a plurality of checkpoints, said sensor responding to its proximity to a token by producing a signal indicating that the portable device is proximate a checkpoint during the safety inspection; and (f) a controller coupled to the display, the memory, the operator interface, and the sensor, said controller executing the machine instructions and causing the memory to at least temporarily store data indicative of each checkpoint visited during the safety inspection, in response to the signal produced by the sensor.

* * * * *